INVENTOR.
William J. O'Brien
BY R. F. Barnard
ATTORNEY

United States Patent Office 3,022,362
Patented Feb. 20, 1962

3,022,362
THERMOCOUPLE LEAD ATTACHMENT
William J. O'Brien, Indianapolis, Ind., assignor to General Motors Corporation, Detroit, Mich., a corporation of Delaware
Filed July 31, 1958, Ser. No. 752,294
2 Claims. (Cl. 136—4)

The present invention relates to improved means for attaching thermocouple lead wires to thermocouple studs. The present invention results in a thermocouple assembly in which the failures or rejections due to faulty connecting mechanisms are considerably reduced.

The present invention relates to thermocouples in which alloys such as those of aluminum-nickel and chromium-nickel are used in the thermo-electric circuit including the hot leads and connector studs. Particularly when used with jet engines, it is important that thermocouple accurately reflect engine temperatures. It is for this reason that such alloys are used since previous types of thermocouple materials have been found to have varying thermo-electric properties and have accordingly not provided the requisite accuracy under high temperature operating conditions.

However, while such alloy materials have provided the required accuracy in terms of temperature measurement, they have created certain secondary problems related to mechanical strength and machinability. It has been the practice to thread the connector studs made of these alloys as part of the means for connecting the leads thereto. Such alloys are approximately 90 to 95% nickel. As a result studs made of these materials when threaded have extremely sensitive threads and any nick or blemish on the thread will produce galling with a resultant thermocouple rejection.

The present invention, therefore, provides a non-threaded means for connecting the thermocouple lead wires to connector studs in such a way as to provide a new and improved thermocouple assembly.

More specifically, the present invention includes a plurality of smooth stud members adapted to coact with corresponding members mounted upon a flexible plate removably fixed to a stud supporting plate. In the illustrated embodiment of the invention the stud members terminate at one end in spherically shaped sections which coact with corresponding cup-shaped ends of the members mounted upon the flexible plate. The use of spherically shaped connector members coupled with the flexible plate for basing the members into engagement with one another insures a good electrical contact is provided between the studs and the leads connecting with a suitable temperature indicating instrument.

Other objects and advantages of the present invention will be apparent from a perusal of the detailed description which follows.

Figure 1:
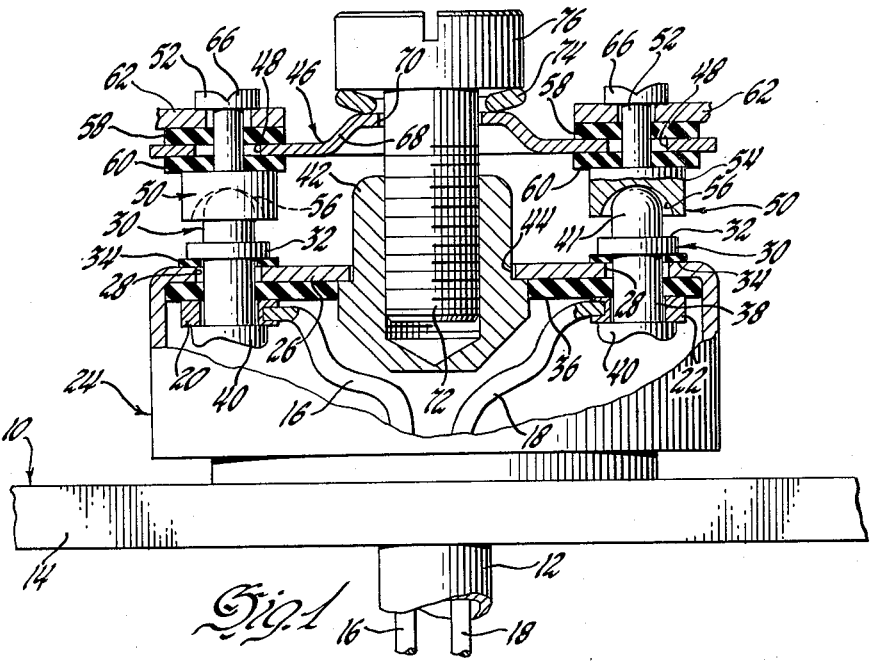
Figure 2:
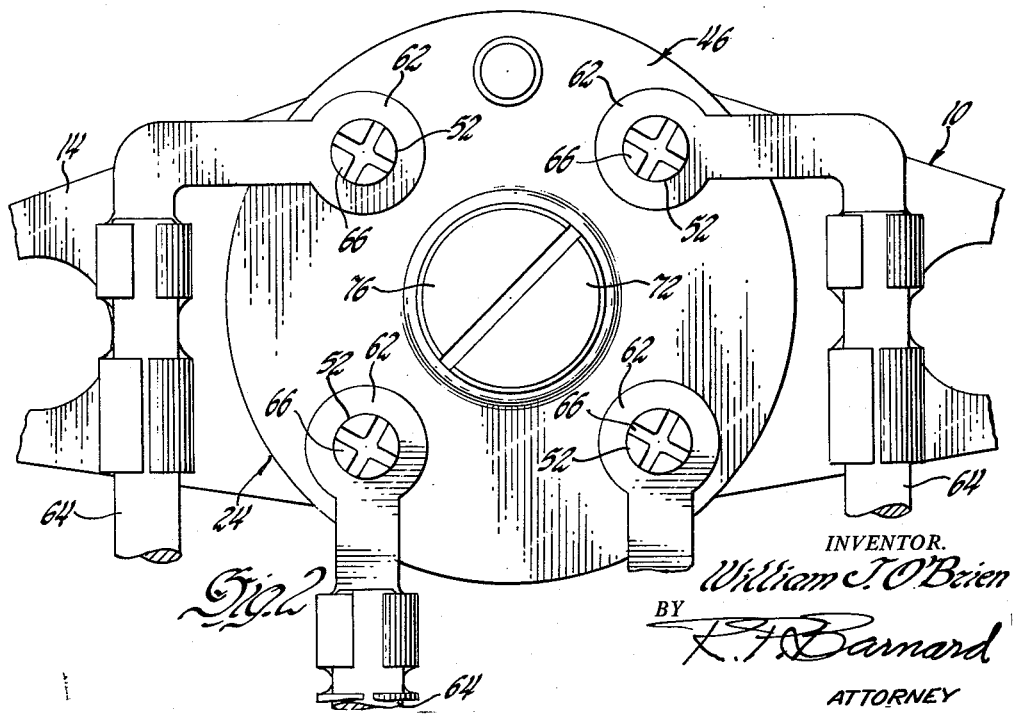

In the drawings:
FIGURE 1 is an elevational view of the thermocouple assembly with parts broken away and in section; and
FIGURE 2 is a plan view of the thermocouple embodying the subject invention.

While the present invention may be utilized in any environment in which a thermocouple is used, as already noted, it is particularly adapted for use with jet engines. A thermocouple is indicated generally at 10 and includes a probe casing 12 adapted to be disposed within the portion of the engine in which the temperature is to be indicated. Probe casing 12 is suitably secured to a plate member 14 which supports thermocouple 10 upon the engine.

The thermocouple, per se, does not form a part of the present invention, accordingly, it will suffice to note that a pair of thermocouple wires 16 and 18 are disposed within probe casing 12 and are connected at their inner ends in the normal manner. As already suggested, these wires will be respectively formed of accurate high temperature sensing materials such as the alloys of aluminum and nickel and chromium and nickel.

The upper ends of wires 16 and 18 are respectively connected to washer-like members 20 and 22 formed of the same material as the wires.

The thermocouple also includes a cover casing member indicated generally at 24 which is also suitably mounted upon supporting plate or bracket 14. The upper wall 26 of cover casing 24 includes a plurality of circumferentially spaced openings 28 within which stud members 30 are adapted to be supported. Since the stud members are identically formed, save for using dissimilar materials, it will suffice to describe only one of such members. Referring to FIGURE 1, stud 30 includes a flange portion 32 disposed intermediate its ends and which flange provides a surface upon which the studs will be supported on wall 26 of casing 24. Since the material of which the thermocouple casings are formed will have different and less desirable thermo-electric characteristics from the lead wires, studs, etc., it is necessary that the latter components be electrically insulated from the thermocouple casings. For this reason an insulating washer 34, which may be made of any suitable material such as mica, is disposed intermediate stud flange 32 and upper wall 26 of casing 24. The bottom face of casing wall 26 is similarly insulated by the use of an annular insulating washer 36 having the requisite number of aligned stud holes formed therein.

Thus to assemble, studs 30 are inserted through the casing openings 28 so that the lower portion or shank 38 of the stud extends through casing wall 26 and washer 36 after which hot lead washer 22 is mounted on the stud. Thereafter stud shank end 40 is peened over to secure the stud and lead to casing 24.

The upper end of stud 30 terminates in a hemispherically shaped section 41, the purpose of which will subsequently be considered in greater detail.

An internally threaded upwardly opening boss member 42 is centrally fixed within an aperture 44 in casing wall 26. As will subsequently be seen, boss 42 provides a part of the means for connecting a plate member 46 to casing member 24.

Plate member 46 has a plurality of circumferentially spaced openings 48 formed therein. Each opening 48 is adapted to receive a connector member 50 each aligned with a stud 30. Each connector member 50 includes a shank portion 52 which terminates at one end in an enlarged portion 54 having hemispherically shaped recess 56 adapted to coact with the similarly shaped end 41 of a stud member 30.

For reasons already discussed, each connector member 50 is mounted in insulated relation upon plate member 46 by the use of insulating washers 58 and 60 disposed on opposite sides of said plate.

To assemble each connector 50 on plate 46, insulating washer 60 is placed over the shank portion 52 and the shank inserted upwardly through plate opening 48 after which insulating washer 58 is placed thereover. A washer-like member 62 fixed to lead 64 is next placed over shank 52. Thereafter end 66 of shank 52 is peened over so as to secure the sub-assembly together.

Cold lead 64 connects with a suitable temperature indicating instrument not shown.

In order to mount plate 46 upon and above thermocouple casing 24, a centrally raised portion 68 is formed on the plate and has an aperture 70 formed therethrough. A threaded stud member 72 is adapted to extend through opening 70 and be threaded into boss member 42. A lock washer member 74 is disposed between the head 76 of stud 72 and raised portion 68 of the plate 46. Thus by threading stud 72 into boss 42 the assembly of casing 24 and plate 46 are held together.

Plate 46 constitutes an important element of the subject thermocouple device since it is constructed in a manner to insure proper electrical contact between stud members 30 and connector members 50 under all operating conditions to which the thermocouple will be subjected. As noted, plate 46 is flexible and further is preferably formed of a high temperature spring material.

Thus by threading stud 72 into boss 42 stud head 76, through washer 74, biases raised portion 68 of plate 46 downwardly to create a resilient force urging connectors 50 into engagement with studs 30. The resilient nature of plate 46 insures that a good electrical contact is established between each conductor and stud even though there might be slight variations in the lengths of these components.

In addition, by stud 72 centrally depressing and hence putting a bias on plate 46 through the axial reaction of studs 30 transmitted through connectors 50, electrical contact is maintained between the studs and connectors notwithstanding differentials in growth induced in the different connector assembly materials when subjected to high temperature operating conditions.

The ball and socket type engagement between stud members 30 and connector members 50 is preferred for several reasons. First, the ball and socket arrangement permits rapid centering and alignment between the studs and connectors. Additionally, the coacting spherical surfaces insures good electrical contact between the studs and connectors during the flexure of plate 46 under the threading action of stud 72.

However, notwithstanding the advantages of the coacting spherical surfaces on studs 30 and connectors 50, it is apparent that the invention is not limited to this arrangement and other shapes, e.g. flat, of coacting surfaces may be utilized.

I claim:

1. A thermocouple assembly comprising a probe casing, a cover casing connected to said probe casing, a plurality of electrically connected thermocouple wires disposed in said probe casing, a plurality of stud contact members mounted on said cover casing and respectively connected to said thermocouple wires, a flexible plate member supported upon and disposed above said cover casing in axially spaced relation thereto, a plurality of connector members mounted upon said plate member and adapted to be aligned and electrically contact with said stud members, said stud and connector members being formed to provide a ball and socket connection through which they coact to make electrical contact, a threaded boss centrally mounted upon said cover casing, a centrally disposed aperture in said plate member, and a stud member adapted to project through said aperture and threadably engage said boss to maintain said connector and said stud members in axial engagement.

2. A thermocouple assembly as set forth in claim 1 in which said stud contact members are mounted adjacent the periphery of said plate a substantially equal distance from the aperture whereby the stud member may be threaded into the boss to resiliently bias the stud contact members into engagement with said connectors.

References Cited in the file of this patent
UNITED STATES PATENTS

| | | |
|---|---|---|
| 1,392,558 | Darrah et al. | Oct. 4, 1921 |
| 2,457,119 | Bour | Dec. 28, 1948 |
| 2,666,909 | Farrington | Jan. 19, 1954 |
| 2,870,233 | Comer | Jan. 20, 1959 |